(12) United States Patent
Li et al.

(10) Patent No.: US 7,213,947 B2
(45) Date of Patent: May 8, 2007

(54) MULTIPLE OUTPUT ILLUMINATION USING REFLECTORS

(75) Inventors: Kenneth K. Li, Arcadia, CA (US); Sheldon Sillyman, Murrieta, CA (US)

(73) Assignee: Wavien, Inc., Santa Clarita, CA (US)

( * ) Notice: Subject to any disclaimer, the term of this patent is extended or adjusted under 35 U.S.C. 154(b) by 0 days.

(21) Appl. No.: 10/530,079

(22) PCT Filed: Oct. 2, 2003

(86) PCT No.: PCT/US03/31115

§ 371 (c)(1),
(2), (4) Date: Jan. 20, 2006

(87) PCT Pub. No.: WO2004/033958

PCT Pub. Date: Apr. 22, 2004

(65) Prior Publication Data

US 2006/0193146 A1  Aug. 31, 2006

Related U.S. Application Data

(60) Provisional application No. 60/418,169, filed on Oct. 15, 2002, provisional application No. 60/415,753, filed on Oct. 4, 2002.

(51) Int. Cl.
*F21V 33/00* (2006.01)

(52) U.S. Cl. ........................ 362/346; 362/297; 362/301; 362/304; 362/551; 362/560

(58) Field of Classification Search ................ 362/346, 362/296, 297, 341, 298, 301, 302, 304, 347, 362/349, 350, 560, 551, 552, 580
See application file for complete search history.

(56) References Cited

U.S. PATENT DOCUMENTS

| 4,564,892 | A | * | 1/1986 | Oram | ........................ 362/297 |
| 6,619,820 | B2 | * | 9/2003 | Li | ............................... 362/302 |
| 2004/0174709 | A1 | * | 9/2004 | Buelow et al. | ............. 362/296 |
| 2005/0057931 | A1 | * | 3/2005 | Vanden Eynden | .......... 362/346 |

* cited by examiner

*Primary Examiner*—Laura Tso
(74) *Attorney, Agent, or Firm*—Fulbright & Jaworski (57) ABSTRACT

A multiple output illumination system includes a first and second reflectors each having an optical axis and a first and second focal points substantially on the optical axis. In one embodiment, one of the focal points of each reflector are proximate to one another, while the other focal point of each reflector is distal from each other. In another embodiment, the first and second reflectors are pairs of reflectors, and the second reflector of each points away from the optical axes of the first and second reflectors. An intermediate reflector may redirect radiation from the second reflectors. A source of electromagnetic radiation substantially proximate to the focal points that are proximate to one another produces rays of radiation that are reflected by the each reflector in different directions, converging substantially at each of the distal focal points. Light pipes placed substantially proximate to the distal focal points may collect the radiation.

26 Claims, 6 Drawing Sheets

MULTIPLE OUTPUT ILLUMINATION USING REFLECTORS

CROSS-REFERENCE TO RELATED APPLICATIONS

This application claims benefit of Provisional Application Ser. Nos. 60/415,753, filed Oct. 4, 2002, and 60/418,169, filed Oct. 15, 2002, the disclosures of which are incorporated by reference.

FIELD OF THE INVENTION

The invention relates to illuminators for coupling light into light guides such as optical fibers.

DESCRIPTION OF THE RELATED ART

Optical fibers may be used to transport light. Optical fibers are often designed to maximize the portion of the light launched into the fiber that exits at the end of the fiber. Side-lit optical fibers, on the other hand, are constructed so that the cladding allows a portion of the light traveling through the core of the fiber to exit from the sides of the fiber, rather than being retained until it reaches the end of the fiber. Side-lit optical fibers thus essentially 'leak' light. The leaked light appears to be illumination to one viewing the optical fiber from the side, hence the term 'side-lit'.

Side-lit optical fibers may be substituted for the noble gas-filled tubes used in so-called 'neon' lights. Side-lit optical fibers may be arranged in much the same way as gas-filled tubes to form letters, pictures, and so on. Since side-lit fibers dispense with the glass-blowing inherent in lights constructed of gas-filled tubes, side-lit fibers may be more versatile than neon lights.

The amount of light that is launched into a fiber is related, in part, to the angle of incidence at which light strikes the input face of the optical fiber. The maximum angle of incidence at which light may strike the input face of the optical fiber and propagate through the optical fiber is known as the cut-off angle (CA). The angle of the incidence will generally be maintained as the light propagates through the optical fiber.

The NA of the input face of the optical fiber may be related to the cut-off angle of the optical fiber by:

$$NA = n_0 * \sin CA$$

where $n_0$ is the index of refraction of the air at the input face of the optical fiber.

Light striking the interface between the core and the cladding at an angle of incidence less than a so-called critical angle may be guided by the optical fiber and remain within the optical fiber. Such light may be maintained within the optical fiber by the total internal reflection at the interface between the cladding and the core of the optical fiber.

Light striking the interface between the core and the cladding at an angle of incidence greater than a so-called critical angle, on the other hand, may not be maintained within the optical fiber core. If the index of refraction of the cladding is low relative to that of the core, light striking the interface between the cladding and the core may be transmitted out through the cladding, rather than reflected back into the core, appearing as illumination.

The numerical aperture (NA) of the fiber itself is given by:

$$NA^2 = n_1^2 - n_2^2$$

where $n_2$ is the index of refraction of the cladding and $n_1$ is the index of refraction of the core. The amount of light leaked by the cladding may thus depend on the index of refraction of the cladding ($n_{22}$) relative to that of the core ($n_{12}$), as well as the angle at which the light entered the fiber in the first place.

The rate of leakage may thus be controlled by controlling the angle at which light enters the fiber as well as by controlling the relative indices of refraction of the core and the cladding. If the angle of incidence at the input face is smaller than the cutoff angle, a profile of light intensity along the length of the fiber can be controlled by the relative indices of refraction of the core and the cladding, rather than by the cutoff angle. An intensity profile controlled by the relative indices of refraction may be more uniform than one controlled by the cutoff angle.

Since a finite quantity of light is input to the optical fiber in the first place, and light is transmitted out of the fiber through the cladding as it travels through the fiber, the fiber may eventually go dark somewhere along its length. If the fiber is too long, the intensity may drop eventually to a point such that the uniformity will not be acceptable, but where illumination is desired. If the fiber is too short, too much light will make it to the other end without providing illumination, and thus will be wasted. A more uniform illumination may allow the light to be used more efficiently by making it easier to predict how far the light will propagate through the fiber.

Figure 1:
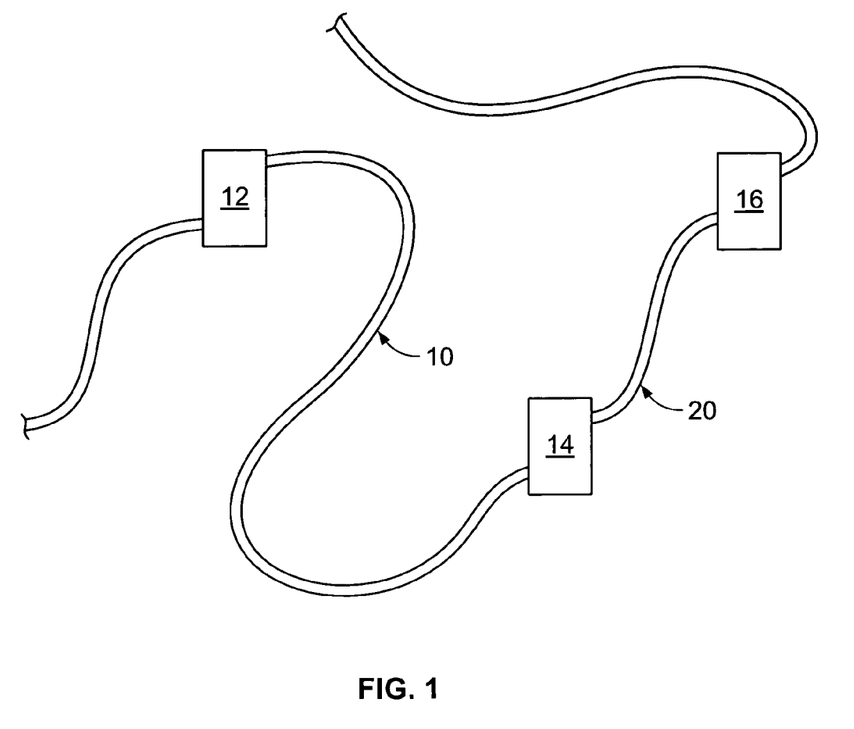
FIG. 1 shows dual output illuminators used to daisy chain fibers together for use with an embodiment of the invention.

One way to illuminate a longer length of fiber may be to couple light into the fiber optic from both ends. One way to implement such a system is to employ two illuminators, one at each end of the fiber. Dual output illuminators may be used to daisy chain fibers together, as may be seen in FIG. 1. In FIG. 1, fiber 10 is illuminated by illuminators 12 and 14 and fiber 20 is illuminated by illuminators 14 and 16.

Dual output illuminators may be implemented in various ways. One way is to connect a pair of fibers to a single output port of an illuminator. One of the ends of each of a pair of optical fibers, for example, may be bundled into the output port of an illuminator. Two circular fibers, for example, may be packed side-by-side in a single output port.

Packing two circular fibers together side-by-side, however, may be inefficient since the output of an illuminator will generally be circular as well, and a circular light pattern shown on two adjacent circular input ends will result in losses between the input ends.

Another method is used by the Fiberstars EFO™ system used in Fiberstars, Inc. illuminators. In the Fiberstars EFO™ system, light output from a single lamp is coupled to two fibers using two separate reflectors. A circular light pattern produced by each of the reflectors falls on the input end of a single optical fiber, thus reducing loses due to light missing the input end.

SUMMARY OF THE INVENTION

In a first aspect, a multiple output illumination system includes a first reflector having a first optical axis and a first and second focal points substantially on the first optical axis, a second reflector having a second optical axis and a third and fourth focal points substantially on the second optical axis, the third focal point being substantially proximate to the first focal point and the fourth focal point being substantially distal from the second focal point, a source of electromagnetic radiation substantially proximate to the first or the third focal points to produce first rays of radiation that are reflected substantially by the first reflector and converge substantially at the second focal point and to produce second rays of radiation that are reflected substantially by the second reflector and converge substantially at the fourth focal point, a first light pipe having a first input end substantially proximate to the second focal point to be illuminated with at least a portion of the first rays of radiation, and a second light pipe having a second input end substantially proximate to the fourth focal point to be illuminated with at least a portion of the second rays of radiation.

In a second aspect, a multiple output illumination system includes a first reflector having a first optical axis and a first focal point substantially on the first optical axis, a second reflector having a second optical axis and a second focal point substantially on the second optical axis, the second focal point being substantially proximate to the first focal point, a source of electromagnetic radiation substantially proximate to the first or the second focal points to produce first rays of radiation that are reflected substantially by the first reflector toward a first intermediate reflector and to produce second rays of radiation that are reflected substantially by the second reflector toward a second intermediate reflector, a third reflector having a third optical axis and a third focal point substantially on the third optical axis receiving the first rays of radiation from the first intermediate reflector and substantially converging them toward the third focal point, a fourth reflector having a fourth optical axis and a fourth focal point substantially on the fourth optical axis receiving the second rays of radiation from the second intermediate reflector and substantially converging them toward the fourth focal point, a first light pipe to be illuminated with at least a portion of the first rays of radiation, the first light pipe having a first input end substantially proximate to the third focal point, and a second light pipe to be illuminated with at least a portion of the second rays of radiation, the second light pipe having a second input end substantially proximate to the fourth focal point.

In a third aspect, a method for using a multiple output illumination system to collect electromagnetic radiation emitted by a source of electromagnetic radiation and substantially focus the collected radiation onto a plurality of targets includes positioning the source of electromagnetic radiation substantially at a focal point of a first and a second reflectors, producing first and second rays of radiation by the source, reflecting the first rays of radiation by the first reflector substantially toward a third reflector and reflecting the second rays of radiation by the second reflector substantially toward a fourth reflector, converging the first rays of radiation substantially at a focal point of the third reflector and converging the second rays of radiation substantially at a focal point of the fourth reflector, positioning a first light pipe having an input end and an output end so that the input end is substantially proximate to the focal point of the third reflector, collecting a substantial portion of the first rays of radiation at the input end of the first light pipe, positioning a second light pipe having an input end and an output end so that the input end is substantially proximate to the focal point of the fourth reflector, collecting a substantial portion of the second rays of radiation at the input end of the first light pipe, positioning a first optical fiber substantially proximate to the output end of the first light pipe and positioning a second optical fiber substantially proximate to the output end of the second light pipe.

DETAILED DESCRIPTION OF THE PREFERRED EMBODIMENTS

Since the angle of incidence of light on the input face of an optical fiber should be smaller than the cut-off angle, it would be desirable for the light to be projected at a small angle of incidence. It would further be desirable for small angles of incidence to be produced from a single lamp for several outputs. Finally, it would be desirable for light from the lamp to be coupled into input surfaces of light pipes at a small etendue.

Figure 2:
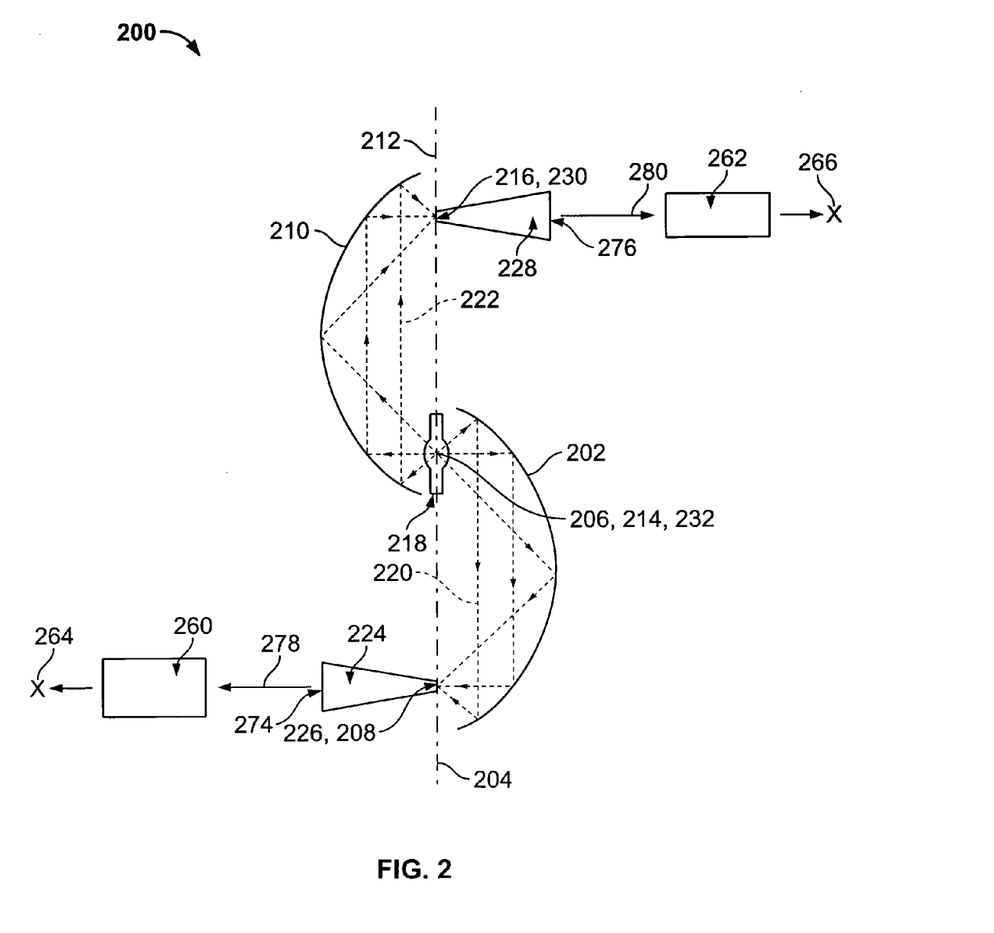
FIG. 2 shows a multiple output illumination system according to a first embodiment of the invention.

In FIG. 2 is shown a multiple output illumination system 200 according to a first embodiment of the invention. Multiple output illumination system 200 may include first and second reflectors 202, 210. In one embodiment, first and second reflectors 202, 210 may have a coating that reflects only a pre-specified portion of electromagnetic radiation spectrum, such as visible light radiation, a pre-specified band of radiation, or a specific color of radiation.

First reflector 202 may have a first optical axis 204 and a first and second focal points 206, 208. First and second focal points 206, 208 may be substantially on first optical axis 204. Second reflector 210 may have a second optical axis 212 and a third and fourth focal points 214, 216. Third and fourth focal points 214, 216 may be substantially on second optical axis 212. Third focal point 214 may be substantially proximate to first focal point 206 while fourth focal point 216 may be substantially distal from second focal point 208. In various embodiments, first or second reflectors 202, 210 may be in the shape of at least a portion of a substantially paraboloidal surface of revolution, a substantially ellipsoidal surface of revolution, a substantially toroidal surface of revolution, or a substantially spheroidal surface of revolution.

A source of electromagnetic radiation 218 may be placed substantially proximate to first or third focal points 206, 214. In various embodiments, source 218 may be a light-emitting arc lamp, such as a xenon lamp, a metal halide lamp, a high intensity discharge (HID) lamp, a halogen lamp, or a high-pressure mercury lamp. In one embodiment, source 218 may be a filament lamp.

If source 218 is an arc lamp, the electrodes may shade an object at either end of the arc from the radiation. A plane of peak illumination for an arc lamp may thus be normal to the arc and between the electrodes. Similarly, if source 218 is a filament lamp, the filament will glow incandescently along its length, and thus may not project much radiation from its ends. Furthermore, the leads to the filament will shield somewhat the radiation at the ends of the filament. The plane of peak illumination of a filament lamp may thus be normal to the filament and between the leads.

Source 218 may produce first rays of radiation 220 that are reflected substantially by first reflector 202 and converge substantially at second focal point 208. Source 218 may also produce second rays of radiation 222 that are reflected substantially by second reflector 210 and converge substantially at fourth focal point 216.

First and second rays of radiation 220, 222 are not necessarily any particular subdivision or portion of the radiation produced by source 218. First and second rays of radiation 220, 222 may be simply the rays that happened to be reflected by either of first and second reflectors 202, 210, or both. Thus the portion of rays of radiation from source 218 that constitute first rays of radiation 220 may be substantially greater than, equal to, or less than the portion that constitutes second rays of radiation 222.

First and second rays of radiation 220, 222 may be reflected by one of first or second reflectors 202, 210 before being reflected by the other. Since source 218 may be proximate to first and third focal points 206, 214 while second and fourth focal points 208, 216 may be distal from focal point, first and second reflectors 202, 210 may effectively split first and second rays of radiation 220, 222, allowing them to be sent in different directions.

An axis of rotation 232 may intersect substantially a center of source 218. Axis of rotation 232 may intersect the center of source 218 at any angle, but in a preferred embodiment the angle at which axis of rotation 232 intersects the center of source 218 is substantially normal to an axis between electrodes or along a filament of source 218, so that the axis of rotation 232 lies substantially in a plane of peak illumination of source 218.

In one embodiment, second reflector 210 may be substantially rotationally symmetric to first reflector 202. In particular, first and second reflectors 202, 210 are substantially rotationally symmetrical about axis of rotation 232. In one embodiment, second optical axis 212 is substantially co-linear with first optical axis 204. If first and second reflectors 202, 210 are substantially rotationally symmetric about axis of rotation 232, first and second rays of radiation 220, 222 may be focused in substantially rotationally symmetric directions as well.

A first input end 226 of a first light pipe 224 may be placed substantially proximate to second focal point 208 to be illuminated with at least a portion of first rays of radiation 220. A second input end 230 of a second light pipe 228 may be placed substantially proximate to fourth focal point 216 to be illuminated with at least a portion of second rays of radiation 222. In one embodiment, first and second light pipes 224, 228 are tapered light pipes.

In one embodiment, first and second reflectors 202, 210 are positioned such that the first and second rays of radiation 220, 222 are imaged onto first and second input ends 226, 230 with a magnification of unity. In this embodiment, first and second reflectors 202, 210 may be of similar size and shape.

In one embodiment, the numerical apertures (NA) of first and second reflectors 202, 210 and first and second light pipes 224, 228 may be matched to each other.

In various embodiments, first or second light pipe 224, 228 may be a single core optic fiber, a fiber bundle, a fused fiber bundle, a polygonal rod, a hollow reflective light pipe, or a homogenizer. In various embodiments, first or second light pipe 224, 228 may have a cross-section such as a circular waveguide, polygonal waveguide, tapered waveguide or a combinations thereof. In various embodiments, first or second light pipe 224, 228 may be made of quartz, glass, plastic, or acrylic.

Figure 9A:
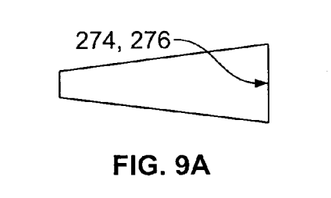
FIG. 9 shows light pipes for use with an embodiment of the invention.
Figure 9B:
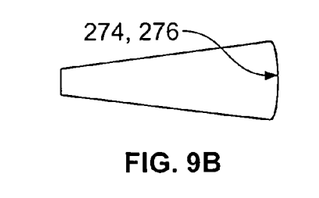

In one embodiment, a first fiber optic 260 may be illuminated by radiation 278 released at a first output end 274 of first light pipe 224. First fiber optic 260 may release radiation 278 to provide for illumination at a desired location 264. In another embodiment, a second fiber optic 262 may be illuminated by radiation 280 released at second output end 276 of second light pipe 228. Second fiber optic 262 may release radiation 280 to provide for illumination at a desired location 266. In various embodiments, first and second output ends 274, 276 can be flat or convex, as shown in FIG. 9. A convex output end may be used to match the output at output ends 274, 276 to a NA of an output device.

Figure 3:
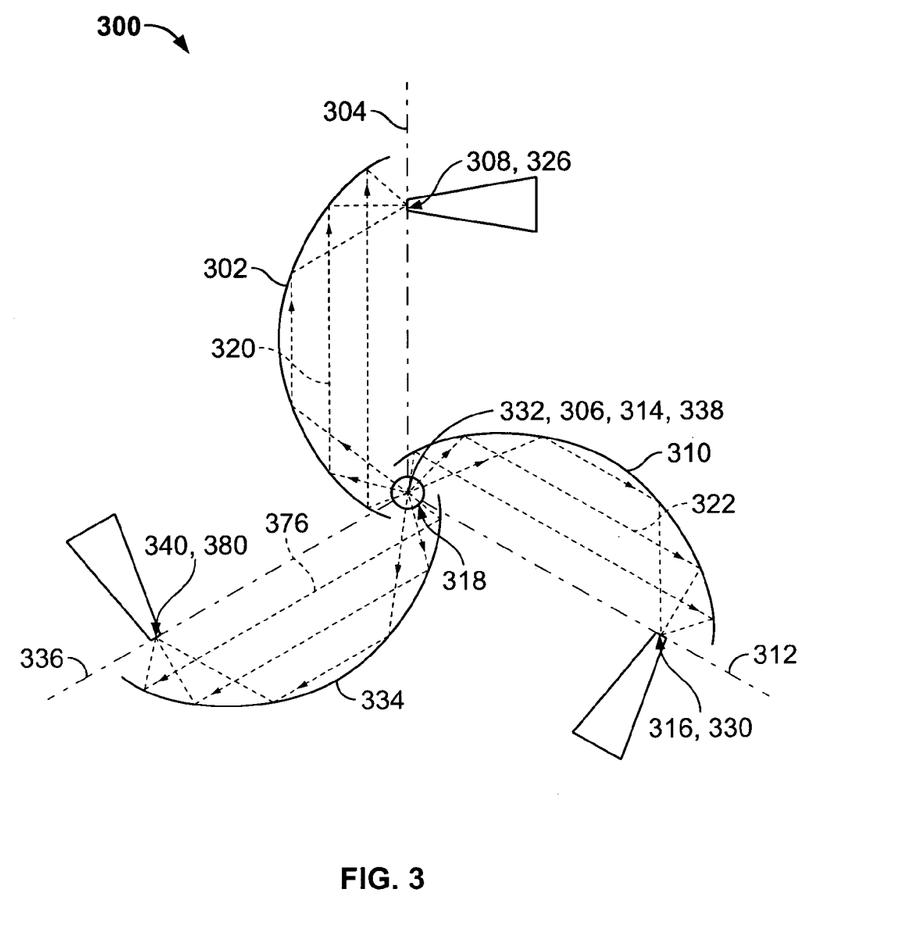
FIG. 3 shows a multiple output illumination system according to a second embodiment of the invention.

In FIG. 3 is shown a multiple output illumination system 300 according to a second embodiment of the invention. Illumination system 300 includes a first, second and third reflectors 302, 310, 334 arranged substantially rotationally symmetrically about an axis of rotation 332. In one embodiment, first, second and third reflectors 302, 310, 334 may be approximately 120° from one another around axis of rotation 332.

First reflector 302 may have a first optical axis 304 and a first and second focal points 306, 308. First and second focal points 306, 308 may be substantially on first optical axis 304.

Second reflector 310 may have a second optical axis 312 and a third and fourth focal points 314, 316. Third and fourth focal points 314, 316 may be substantially on second optical axis 312. Third focal point 314 may be substantially proximate to first focal point 306 while fourth focal point 316 may be substantially distal from second focal point 308.

Third reflector 334 may have a third optical axis 336. Third reflector 334 may have a fifth and sixth focal points 338, 340 substantially on third optical axis 336. Fifth focal point 338 may be substantially proximate to first focal point 306 while sixth focal point 340 may be substantially distal from second and fourth focal points 306, 316.

Axis of rotation 332 may intersect substantially first, third and fifth focal points 306, 314, 338. An arbitrary number of additional reflectors may be arranged substantially rotationally symmetrically about axis of rotation 332 in keeping with the spirit of the invention. If, for example, a fourth reflector were added, the four reflectors could be distributed at 90° to one another around axis of rotation 332.

In another embodiment, each of, said first, second, and third optical axes 304, 312, 336 along with a fourth optical axis of the fourth reflector are directed substantially at a first, second, third, and fourth apices of a tetrahedron with a centroid substantially proximate to a source 318. In this embodiment, a fourth reflector having a fourth optical axis and a seventh and eighth focal points substantially on said fourth optical axis may be added to first, second and third reflectors 320, 310 and 334, with the seventh focal point being substantially proximate to first, third or fifth focal points 306, 314, 338 and the eighth focal point being substantially distal from second, fourth and sixth focal points 308, 316, 340.

A source of electromagnetic radiation 318 may be placed substantially proximate to first, third or fifth focal points 306, 314, 338. Source 318 may produce first rays of radiation 320 that are reflected substantially by first reflector 302 and converge substantially at second focal point 306. Source 318 may also produce second rays of radiation 322 that are reflected substantially by second reflector 310 and converge substantially at fourth focal point 316. Source 318 may also produce third rays of radiation 376 that are reflected substantially by third reflector 334 and converge substantially at sixth focal point 340.

A first input end 326 of a first light pipe 324 may be placed substantially proximate to second focal point 308 to be illuminated with at least a portion of first rays of radiation 320. A second input end 330 of a second light pipe 328 may be placed substantially proximate to fourth focal point 316 to be illuminated with at least a portion of second rays of radiation 322. A third input end 380 of a third light pipe 382 may be placed substantially proximate to sixth focal point 340 to be illuminated with at least a portion of third rays of radiation 376.

Figure 4:
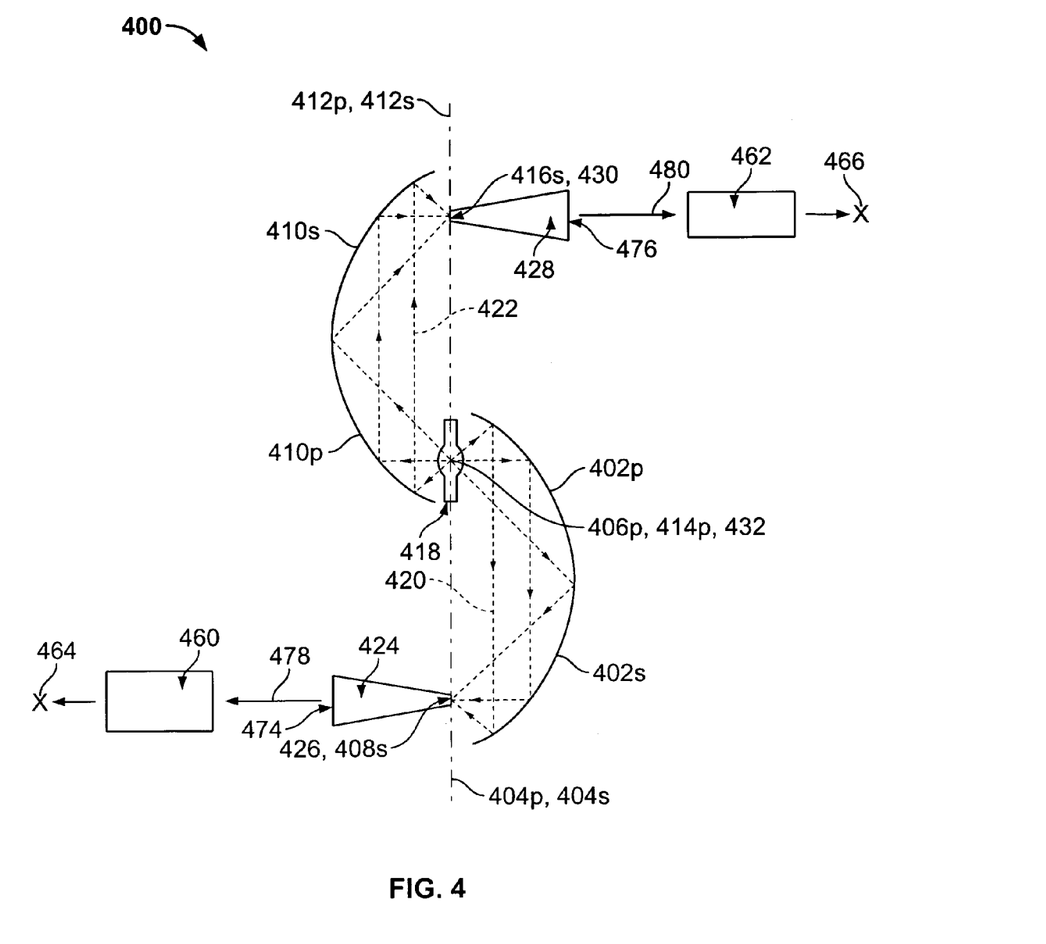
FIG. 4 shows a multiple output illumination system according to a third embodiment of the invention.

In FIG. 4 is shown a multiple output illumination system 400 according to a third embodiment of the invention. The fourth embodiment is similar to the first embodiment, except that the first reflector may be divided into a first primary reflector 402p and a first secondary reflector 402s. First primary reflector 402p may have a first primary focal point 406p and a first primary optical axis 404p. First secondary reflector 402s may have a first secondary focal point 408s and a first secondary optical axis 404s substantially co-linear with first primary optical axis 404p.

The second reflector may be divided into a second primary 410p and a second secondary reflector 410s as well. Second primary reflector 410p may have a second primary focal point 406p and a second primary optical axis 412p. Second secondary reflector 410s may have a second secondary focal point 416s and a second secondary optical axis 412s substantially co-linear with second primary optical axis 412p.

In one embodiment, first and second primary reflectors 402p, 410p or first and second secondary reflectors 402s, 410s may comprise at least a portion of a substantially paraboloidal surface of revolution. In one embodiment, first and second primary reflectors 402p, 410p are substantially mirror images of first and second secondary reflectors 402s, 410s such that first rays of radiation 420 and second rays of radiation 422 are imaged with substantially unit magnification from source 418 to first and second input ends 426, 430, thus preserving the brightness of source 418. The tapered light pipe is made such that the output of the light pipe matches with the dimensions and the numerical aperture (NA) of the output fiber optic.

In another embodiment, first and second primary reflectors 402p, 410p comprise at least a portion of a substantially ellipsoidal surface of revolution while first and second secondary reflectors 402s, 410s comprise a substantially hyperboloidal surface of revolution. In another embodiment, first and second primary reflectors 402p, 410p comprise a substantially hyperboloidal surface of revolution while first and second secondary reflectors 402s, 410s comprise at least a portion of a substantially ellipsoidal surface of revolution.

In one embodiment, the sizes and shapes of the elliptical reflectors may be similar to each other. In another embodiment, the sizes of the elliptical reflectors may be different, but with substantially the same ellipticity. In yet another embodiment, the reflectors can have different ellipticities such that the resultant images of the arc at the inputs of the light pipes are magnified with substantially unit magnification.

Figure 5:
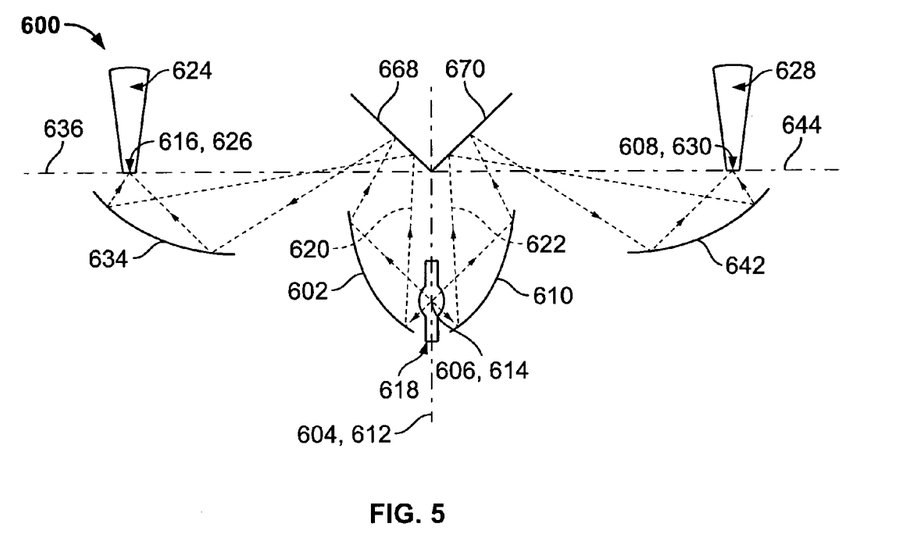
FIG. 5 shows a multiple output illumination system according to a fourth embodiment of the invention.
Figure 6:
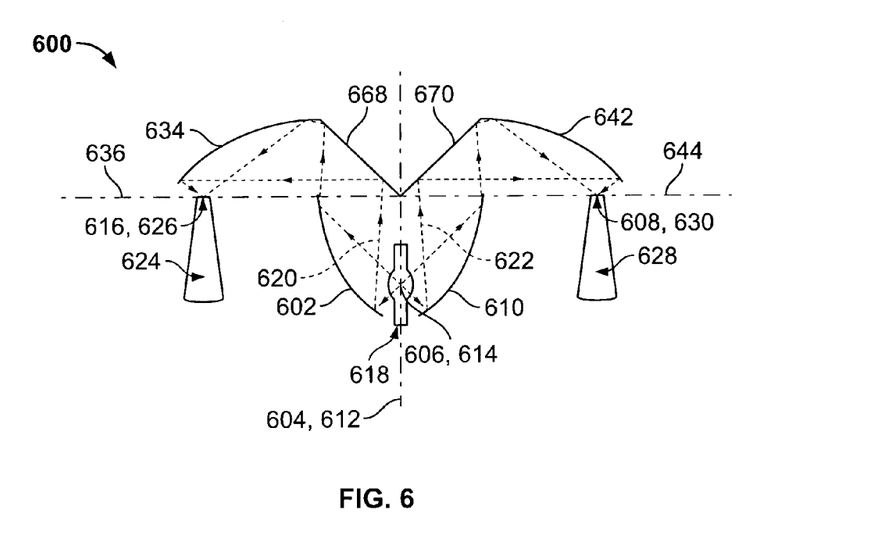
FIG. 6 shows a multiple output illumination system according to a fifth embodiment of the invention.

In FIGS. 5 and 6 are shown a multiple output illumination system 600 according to a fourth and fifth embodiments of the invention. Illumination system 600 includes a first and second reflectors 602, 610. First reflector 602 may have a first optical axis 604 and a first focal point 606 substantially on first optical axis 604. Second reflector 610 may have a second optical axis 612 and a second focal point 614 substantially on second optical axis 612, with second focal point 614 substantially proximate to first focal point 606.

A source 618 of electromagnetic radiation may be substantially proximate to first or second focal points 606, 608, or both. Source 618 may produce first rays of radiation 620 that are reflected substantially by first reflector 602 toward a first intermediate reflector 668. Source 618 may produce second rays of radiation 622 that are reflected substantially by second reflector 610 toward a second intermediate reflector 670.

A third reflector 634 may have a third optical axis 636 and a third focal point 616 substantially on third optical axis 636. Third reflector 634 may receive first rays of radiation 620 from first intermediate reflector 668. Third reflector 634 may converge first rays of radiation 620 substantially toward third focal point 616.

A fourth reflector 642 may have a fourth optical axis 644 and a fourth focal point 608 substantially on fourth optical axis 644. Fourth reflector 642 may receive second rays of radiation 622 from second intermediate reflector 670. Fourth reflector 642 may converge second rays of radiation 622 substantially toward fourth focal point 608.

In one embodiment, first and second intermediate reflectors 668, 670 are substantially flat. In this embodiment, a normal to the surface of first intermediate reflector 668 may bisect an angle between first and third optical axes 604, 636. If, for example, an angle between first and third optical axes 604, 636 is 90°, the normal to the surface of first intermediate reflector 668 would be directed at 45° from either one of first and third optical axes 604, 636 to direct light from first reflector 602 to third reflector 634. The orientation of third reflector 634 relative to first reflector 602 may thus be generalized to include practically any angle between first and third optical axes 604, 636, by adjusting the orientation of first intermediate reflector 668. The orientation of second and fourth reflectors 610, 642 may be generalized to include practically any angle between second and fourth optical axes 612, 644 by adjusting the orientation of second intermediate reflector 670 in a similar manner.

In further embodiments, first and second intermediate reflectors 668, 670 may be substantially concave or convex. If either first or second intermediate reflectors 668, 670 were substantially concave, for example, second or fourth reflectors 610, 642 could be smaller than first and third reflectors 602, 634. If first or second intermediate reflectors 668, 670 were substantially convex, on the other hand, second or fourth reflectors 610, 642 could be larger than first and third reflectors 602, 634.

A first input end 626 of a first light pipe 624 may be placed substantially proximate to second focal point 614 to be illuminated with at least a portion of first rays of radiation 620, while a second input end 630 of a second light pipe 628 may be placed substantially proximate to fourth focal point 608 to be illuminated with at least a portion of second rays of radiation 622. In one embodiment, first and second light pipes 624, 628 are tapered light pipes.

In various embodiments, first, second, third, or fourth reflectors 602, 610, 634, 642 or first or second intermediate reflectors 668, 670 have a coating that reflects only a pre-specified portion of electromagnetic radiation spectrum, such as visible light radiation, a pre-specified band of radiation, or a specific color of radiation. In various embodiments, first or second intermediate reflectors 668, 670 may be coated with silver, a multi-layer dielectric coating with wavelength selectivity, or aluminum. In various embodiments, first or second intermediate reflectors 668, 670 may be implemented as prisms, such as right-angle prisms, or as mirrors.

In one embodiment, second optical axis 612 is substantially co-linear with first optical axis 604, third optical axis 636 is substantially parallel to fourth optical axis 644, third optical axis 636 is substantially normal to first optical axis 604, and fourth optical axis 644 is substantially normal to second optical axis 612.

In another embodiment, second, third, or fourth optical axes 612, 636, 644 are substantially parallel to first optical axis 604.

In one embodiment, first or second optical axes 604, 612 form an axis of rotation 632. Axis of rotation 632 may intersect substantially first or second focal points 606, 608, or both. An arbitrary number of additional reflectors may be arranged substantially rotationally symmetrically about axis of rotation 632 in keeping with the spirit of the invention. If, for example, a one additional reflector is added to first and second reflectors 602, 610, the three reflectors could be arranged at 120° intervals around axis of rotation 632. Four reflectors could be arranged at 90° intervals, and so on.

In one embodiment, one of first, second, third, or fourth reflectors 602, 610, 634, 642 form portions of a substantially paraboloidal surface of revolution, a substantially ellipsoidal surface of revolution, a substantially toroidal surface of revolution, or a substantially spheroidal surface of revolution.

Figure 7:
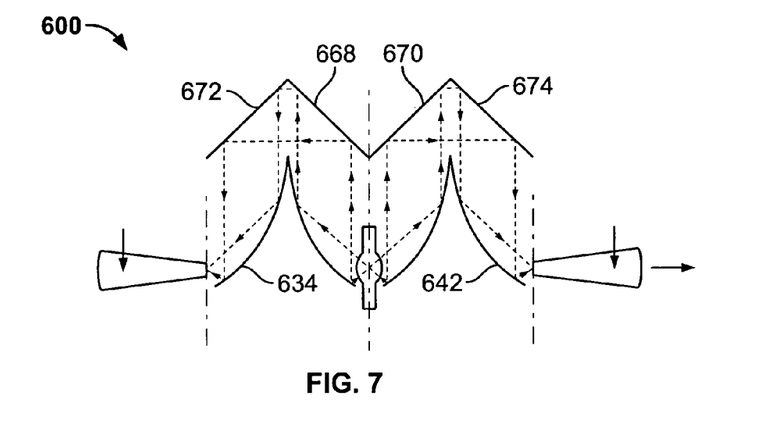
FIG. 7 shows a multiple output illumination system according to a sixth embodiment of the invention.
Figure 8:
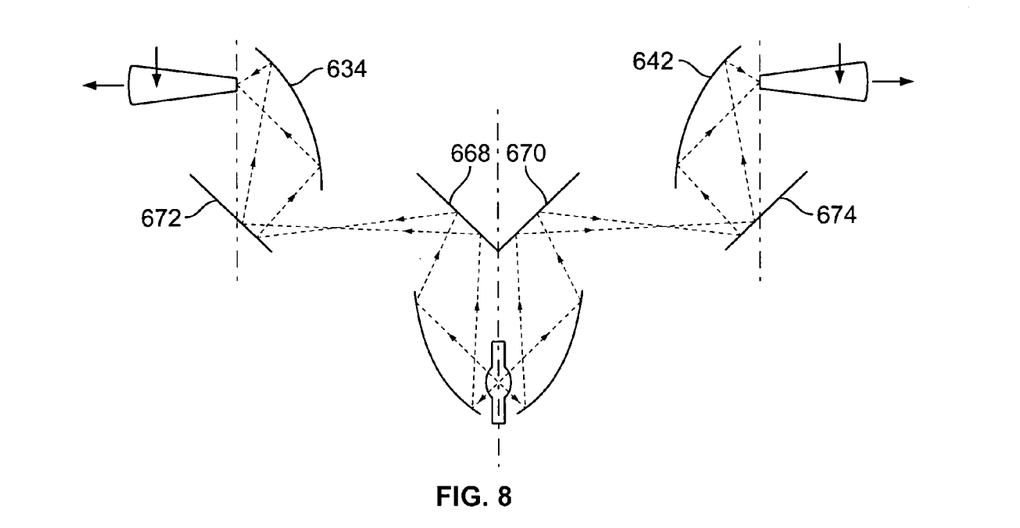
FIG. 8 shows a multiple output illumination system according to an seventh embodiment of the invention.

In a sixth and seventh embodiments, shown in FIGS. 7 and 8, a third intermediate reflector 672 may receive first rays of radiation 620 from first intermediate reflector 668 and reflect them toward third reflector 634. A fourth intermediate reflector 674 may receive second rays of radiation 622 from second intermediate reflector 670 and reflect them toward fourth reflector 642, as well. Third and fourth intermediate reflectors 672, 674 may be substantially flat, concave, or convex in a manner similar to first and second intermediate reflectors 668, 670.

In an eighth embodiment, a method for collecting electromagnetic radiation emitted by a source 618 of electromagnetic radiation and substantially focusing collected radiation onto a plurality of targets includes positioning source 618 of electromagnetic radiation substantially at a focal point 606, 614 of a first and second reflectors 602, 610, producing first and second rays of radiation 622 by source 618, reflecting first rays of radiation 620 by first reflector 602 substantially toward a third reflector 634 and reflecting second rays of radiation 622 by second reflector 610 substantially toward a fourth reflector 642, converging first rays of radiation 620 substantially at a focal point 608 of third reflector 634 and converging second rays of radiation 622 substantially at a focal point 616 of fourth reflector 642, positioning a first light pipe 624 may have a first input end 626 and a first output end 674 so that first input end 626 is substantially proximate to focal point 608 of third reflector 634, collecting a substantial portion of first rays of radiation 620 at first input end of 626 first flight pipe 624, positioning a second light pipe 628 may have a second input end 630 and a second output end 676 so that second input end 630 is substantially proximate to focal point 616 of fourth reflector 642, collecting a substantial portion of second rays of radiation 622 at input end of first light pipe 624, positioning a first optical fiber 660 substantially proximate to first output end 674 of first light pipe 624 and positioning a second optical fiber 662 substantially proximate to second output end 676 of second light pipe 628.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A multiple output illumination system comprising:
   a first reflector having a first optical axis and a first and second focal points substantially on said first optical axis;
   a second reflector having a second optical axis and a third and fourth focal points substantially on said second optical axis, said third focal point being substantially proximate to said first focal point and said fourth focal point being substantially distal from said second focal point;
   a source of electromagnetic radiation substantially proximate to said first or said third focal points to produce first rays of radiation that are reflected substantially by said first reflector and converge substantially at said second focal point and to produce second rays of radiation that are reflected substantially by said second reflector and converge substantially at said fourth focal point;
   a first light pipe having a first input end substantially proximate to said second focal point to be illuminated with at least a portion of said first rays of radiation; and
   a second light pipe having a second input end substantially proximate to said fourth focal point to be illuminated with at least a portion of said second rays of radiation.

2. The multiple output illumination system of claim 1, comprising further an axis of rotation through a center of said source, and wherein said first and second reflectors are substantially rotationally symmetrical about said axis of rotation.

3. The multiple output illumination system of claim 1, wherein said second optical axis is substantially co-linear with said first optical axis.

4. The multiple output illumination system of claim 1, comprising further a third reflector having a third optical axis and a fifth and sixth focal points substantially on said third optical axis, said fifth focal point being substantially proximate to said first focal point and said sixth focal point being substantially distal from said second and fourth focal points.

5. The multiple output illumination system of claim 4, comprising further an axis of rotation through a center of said source, and wherein said first, second and third reflectors are substantially rotationally symmetrical about said axis of rotation.

6. The multiple output illumination system of claim 4, comprising further a fourth reflector having a fourth optical axis and a seventh and eighth focal points substantially on said fourth optical axis, said seventh focal point being substantially proximate to said first focal point and said eighth focal point being substantially distal from said second, fourth and sixth focal points.

7. The multiple output illumination system of claim 6, wherein each of said first, second, third, and fourth optical axes are directed substantially at a first, second, third, and fourth apices of a tetrahedron with a centroid substantially proximate to said source.

8. The multiple output illumination system of claim 1, wherein said first and second light pipes are tapered light pipes.

9. The multiple output illumination system of claim 1, wherein a shape of said first and second reflectors is selected from the group consisting of:
- at least a portion of a substantially paraboloidal surface of revolution,
- at least a portion of a substantially ellipsoidal surface of revolution,
- at least a portion of a substantially toroidal surface of revolution, and
- at least a portion of a substantially spheroidal surface of revolution.

10. The multiple output illumination system of claim 1, wherein said first reflector comprises a first primary and a first secondary reflector;
- said first primary reflector having a first primary focal point substantially proximate to said first focal point and a first primary optical axis substantially co-linear with said first optical axis;
- said first secondary reflector having a first secondary focal point substantially proximate to said second focal point and a first secondary optical axis substantially co-linear with said first optical, axis; and
- said second reflector comprises a second primary and a second secondary reflector;
- said second primary reflector having a second primary focal point substantially proximate to said third focal point and a second primary optical axis substantially co-linear with said second optical axis; and
- said second secondary reflector having a second secondary focal point substantially proximate to said fourth focal point and a second secondary optical axis substantially co-linear with said second optical axis.

11. The multiple output illumination system of claim 10, wherein said first and second primary reflectors or said first and second secondary reflectors comprise at least a portion of a substantially paraboloidal surface of revolution.

12. The multiple output illumination system of claim 10, wherein said first and second primary reflectors comprise at least a portion of a substantially ellipsoidal surface of revolution; and
- said first and second secondary reflectors comprise at least a portion of a substantially hyperboloidal surface of revolution.

13. The multiple output illumination system of claim 10, wherein said first and second primary reflectors comprise at least a portion of a substantially hyperboloidal surface of revolution; and
- said first and second secondary reflectors comprise at least a portion of a substantially ellipsoidal surface of revolution.

14. The multiple output illumination system of claim 1, comprising further a first and a second fiber optics;
- said first fiber optic being illuminated by the radiation converged at said first light pipe, said first fiber optic releasing the converged radiation to provide for illumination at a desired location; and
- said second fiber optic being illuminated by the radiation converged at said second light pipe, said second fiber optic releasing the converged and condensed radiation to provide for illumination at a desired location.

15. A multiple output illumination system comprising:
- a first reflector having a first optical axis and a first focal point substantially on said first optical axis;
- a second reflector having a second optical axis and a second focal point substantially on said second optical axis, said second focal point being substantially proximate to said first focal point;
- a source of electromagnetic radiation substantially proximate to said first or said second focal points to produce first trays of radiation that are reflected substantially by said first reflector toward a first intermediate reflector and to produce second rays of radiation that are reflected substantially by said second reflector toward a second intermediate reflector;
- a third reflector having a third optical axis and a third focal point substantially on said third optical axis receiving said first rays of radiation from said first intermediate reflector and substantially converging them toward said third focal point;
- a fourth reflector having a fourth optical axis and a fourth focal point substantially on said fourth optical axis receiving said second rays of radiation from said second intermediate reflector and substantially converging them toward said fourth focal point;
- a first light pipe to be illuminated with at least a portion of said first rays of radiation, said first light pipe having a first input end substantially proximate to said third focal point; and
- a second light pipe to be illuminated with at least a portion of said second rays of radiation, said second light pipe having a second input end substantially proximate to said fourth focal point.

16. The multiple output illumination system of claim 15, wherein said first and second light pipes are tapered light pipes.

17. The multiple output illumination system of claim 15, wherein said second optical axis is substantially co-linear with said first optical axis.

18. The multiple output illumination system of claim 15, wherein said third optical axis is substantially parallel to said fourth optical axis.

19. The multiple output illumination system of claim 15, wherein said third optical axis is substantially normal to said first optical axis.

20. The multiple output illumination system of claim 15, wherein said fourth optical axis is substantially normal to said second optical axis.

21. The multiple output illumination system of claim 20, wherein said second, third, and fourth optical axes are substantially parallel to said first optical axis.

22. The multiple output illumination system of claim 15, wherein a shape of said first, second, third, or fourth reflectors is selected from the group consisting of:
- at least a portion of a substantially paraboloidal surface of revolution,
- at least a portion of a substantially ellipsoidal surface of revolution,
- at least a portion of a substantially toroidal surface of revolution, and
- at least a portion of a substantially spheroidal surface of revolution.

23. The multiple output illumination system of claim 15, comprising further
- a third intermediate reflector receiving said first rays of radiation from said first intermediate reflector and reflecting them toward said third reflector; and
- a fourth intermediate reflector receiving said second rays of radiation from said second intermediate reflector and reflecting them toward said fourth reflector.

24. A method for collecting electromagnetic radiation emitted by a source of electromagnetic radiation and substantially focusing the collected radiation onto a plurality of targets, the method comprising the steps of:

positioning said source of electromagnetic radiation substantially at a focal point of a first and a second reflectors;

producing first and second rays of radiation by said source;

reflecting said first rays of radiation by said first reflector substantially toward a third reflector and reflecting said second rays of radiation by said second reflector substantially toward a fourth refractor;

converging said first rays of radiation substantially at a focal point of said third reflector and converging said second rays of radiation substantially at a focal point of said fourth reflector;

positioning a first light pipe having an input end and an output end so that said input end is substantially proximate to said focal point of said third reflector;

collecting a substantial portion of said first rays of radiation at said input end of said first light pipe;

positioning a second light pipe having an input end and an output end so that said input end is substantially proximate to said focal point of said fourth reflector;

collecting a substantial portion of said second rays of radiation at said input end of said first light pipe;

positioning a first optical fiber substantially proximate to the output end of the first light pipe and positioning a second optical fiber substantially proximate to the output end of the second light pipe.

25. The method for collecting electromagnetic radiation of claim 24, wherein said first and second reflectors comprise at least a portion of a substantially paraboloidal surface of revolution.

26. The method for collecting electromagnetic radiation of claim 24, wherein said first and second reflectors comprise at least a portion of a substantially ellipsoidal surface of revolution.

* * * * *